United States Patent
Borroni

(10) Patent No.: US 8,708,097 B2
(45) Date of Patent: Apr. 29, 2014

(54) ACOUSTIC PANEL

(75) Inventor: Mark Borroni, Surrey Hills (AU)

(73) Assignee: Bellmax Acoustic Pty Ltd., Surrey Hills (AU)

(*) Notice: Subject to any disclaimer, the term of this patent is extended or adjusted under 35 U.S.C. 154(b) by 0 days.

(21) Appl. No.: 13/502,928

(22) PCT Filed: Oct. 21, 2010

(86) PCT No.: PCT/AU2010/001395
§ 371 (c)(1),
(2), (4) Date: May 8, 2012

(87) PCT Pub. No.: WO2011/047429
PCT Pub. Date: Apr. 28, 2011

(65) Prior Publication Data
US 2012/0240486 A1 Sep. 27, 2012

(30) Foreign Application Priority Data

Oct. 21, 2009 (AU) ................. 2009905120
Jul. 13, 2010 (AU) ................. 2010903103

(51) Int. Cl.
*E04B 1/82* (2006.01)

(52) U.S. Cl.
USPC .............................. 181/291; 181/286; 52/144

(58) Field of Classification Search
USPC .............. 52/144, 145; 181/30, 146, 210, 284, 181/286, 290, 291, 295
See application file for complete search history.

(56) References Cited

U.S. PATENT DOCUMENTS

| | | | | | |
|---|---|---|---|---|---|
| 2,990,027 | A | * | 6/1961 | Sabine | 181/291 |
| 3,020,184 | A | * | 2/1962 | Cubberley et al. | 428/138 |
| 3,074,505 | A | * | 1/1963 | Schulz | 181/290 |
| 3,174,580 | A | * | 3/1965 | Schulz et al. | 181/290 |
| 3,649,430 | A | * | 3/1972 | Lewis | 428/138 |
| 3,834,487 | A | * | 9/1974 | Hale | 181/292 |
| 3,999,343 | A | * | 12/1976 | Roberts | 52/241 |
| 4,313,524 | A | * | 2/1982 | Rose | 181/291 |
| 4,553,631 | A | * | 11/1985 | Panza | 181/291 |
| 5,125,475 | A | * | 6/1992 | Ducharme et al. | 181/284 |
| 5,362,931 | A | * | 11/1994 | Fries | 181/284 |
| 6,720,069 | B1 | | 4/2004 | Murakami et al. | |
| 2007/0186493 | A1 | * | 8/2007 | Baig | 52/144 |

FOREIGN PATENT DOCUMENTS

| | | |
|---|---|---|
| EP | 0892386 A2 | 6/1998 |
| EP | 1306205 A1 | 5/2003 |
| GB | 1579897 A | 11/1980 |
| WO | 2009/023900 A1 | 2/2009 |

* cited by examiner

*Primary Examiner* — Ryan Kwiecinski
(74) *Attorney, Agent, or Firm* — Westerman, Hattori, Daniels & Adrian, LLP

(57) ABSTRACT

A panel (1) including a substantially air impermeable membrane layer (3) and a layer (5) having apertures (6) therein, wherein each portion of the membrane layer (3) which overlies an aperture (6) defines a diaphragm (9) which is able to vibrate in response to sound waves incident on the membrane layer (3) and thereby absorb at least part of the sound waves' energy, at least some of the apertures (6) being arranged in clusters (11) whereby the greatest distance between adjacent apertures within a cluster (11) is less than the distance between (i) any one of the apertures (6) within the cluster (11) and (ii) any aperture (6) outside of the cluster (11), each region of the panel (1) defined by an outer periphery of a cluster (11) forming a resonance absorber (13) which is able to vibrate in response to sound waves and thereby absorb at least part of the sound waves energy, wherein at least one resonance absorber (13) is able to provide sound absorption at a frequency which is different to the frequency of resonance of at least one of the individual diaphragms (9).

15 Claims, 13 Drawing Sheets

ACOUSTIC PANEL

CROSS-REFERENCE TO RELATED APPLICATIONS

The present patent application is a nationalization of International application No. PCT/AU2010/001395, filed Oct. 21, 2010, published in English, which is based on, and claims priority from, Australian Application No. 2009905 filed Oct. 21, 2009 and Australian Application No. 2010903103, filed Jul. 13, 2010, all of which are incorporated herein by reference in their entireties.

FIELD OF THE INVENTION

The present invention relates to an acoustic panel which is acoustically absorbent relative to conventional air impermeable panels, for example plasterboard or drywall, across a broad range of frequencies. The panel according to the present invention is suited for lining an interior wall or ceiling of a building in the same manner as conventional plasterboard panels. The panel according to the invention is also suitable for lining other structures that are required to absorb noise. Various forms of the panel are also suitable for automotive applications and as sound absorptive roadside barriers.

BACKGROUND TO THE INVENTION

The interior walls of buildings, for example houses, offices, restaurants, retail stores, hospitals and the like typically include a frame lined with plasterboard panels. The frame of the wall normally includes a series of upright beams, commonly referred to as studs, to which the plasterboard panels are mounted. The panels are mounted to the studs such that the edges of adjoining panels abut one another. The edges are then covered with wet plaster and subsequently sanded when the plaster dries to provide a continuous wall surface. The wall surface created by the plasterboard panels is also usually painted to provide an aesthetically pleasing appearance.

In general, hard, solid materials, for example plasterboard panels, reflect sound better than softer air permeable materials. In this respect, sound waves incident upon an interior wall lined with plasterboard tend to be reflected well. The reflected sound waves can also undergo reflection by bouncing off other walls and surfaces, even after the source ceases emitting sound. This phenomenon is known as reverberation and the time it takes for reverberant sound energy to dissipate by 60 dB is known as the reverberation time. The reverberation time in an enclosure, for example a room, can make a significant impact upon the intelligibility of speech. In this respect if the reverberation time is too long speech can be difficult to interpret as the reverberant sound in the room acts as background noise.

Ideally, the issue of reverberation is considered and addressed at the design stage of a building. However, in some instances, reverberation problems may not become apparent until construction of a building is completed. In both cases there are various options available to address reverberation issues. These typically include the use of perforated acoustic tiles, carpet, curtains, fabric wall linings and other soft materials. Unfortunately, many of these options are not able to adequately blend with the desired aesthetic appearance.

The acoustic panel disclosed in International Publication No. WO 2009/023900, (herein after referred to as "the Bellmax panel"), the contents of which are herein incorporated by reference, sought to address the issue of aesthetic appearance by providing a sound absorbing acoustic panel which mimicked the look and feel of a conventional plasterboard panel, could be painted like conventional plasterboard yet remain sound absorbing, and be installed using the same installation method as conventional plasterboard. Although the Bellmax panel had the desired aesthetic appearance, its ability to absorb sound wave energy once painted was found to be limited to specific frequencies.

FIG. 1 of the accompanying drawings provides a graph showing the absorption coefficient across a range of frequencies for a painted sample Bellmax panel of the prior art. The sample Bellmax panel consisted of a membrane layer made of paper, and an underlying sound absorbing layer made of fibrous polyester having a surface density of approximately 1800 $g/m^2$ (without apertures). The sound absorbing layer had a plurality of 15 mm apertures extending therethrough which provided the layer with 33% open area. The sample was mounted to a frame structure having wall type studs with sound absorbing material having a surface density of approximately 800 $g/m^2$ being located behind the sample in a wall type cavity having a depth of 25 mm.

The graph in FIG. 1 demonstrates that the sample Bellmax panel has two prominent absorption peaks 2, 4 at approximately 300 Hz and 1700 Hz with virtually no absorption being provided at other frequencies. The absorption peak 2 at 300 Hz is due to the sample Bellmax panel, in combination with the enclosed air volume in the wall type cavity behind the sample, acting as a panel absorber. In this respect, a panel absorber is a form of resonant oscillating mass-spring system whereby the panel is able to resonate in response to sound waves incident on the panel with dampening being provided by the enclosed air volume. The absorption peak 4 at 1700 Hz is due to the portions of the membrane layer which overlie the 15 mm apertures acting as diaphragms. These diaphragms vibrate at maximum amplitude when imparted with sound waves of a frequency corresponding to their resonant frequency, thereby reducing the sound waves energy. Apertures of different and increased size could be used to broaden the range of frequencies absorbed below 1700 Hz. However, suitable absorption at frequencies between approximately 350 Hz and 800 Hz and lower than 350 Hz would require much larger apertures in the Bellmax panel and/or a much greater depth in the wall cavity behind the sample. A problem with increasing the size of the apertures is that it becomes increasingly difficult for the portions of the membrane layer which overlie the apertures to retain a surface finish which can mimic that of a conventional plasterboard panel, particularly after the membrane layer is painted. In addition, the depth of the enclosure behind the panel can not be readily increased beyond the fixed depth of the wall cavities of the building.

In view of the above, it would be desirable to provide an acoustic panel having a variety of applications which is able to absorb sound wave energy across a broad range of frequencies. It would also be desirable to provide an acoustic panel which when used as an interior wall lining, is able to mimic the look and feel of a conventional plasterboard panel when painted. Such a panel could be used to reduce reverberation within the interior of buildings. It would also be desirable to provide an acoustic panel which could be used in automotive applications, for example on the firewall of an engine bay or as an underbody lining, to reduce sound wave energy and heat transfer to the passenger compartment of a motor vehicle. It would further be desirable to provide an acoustic panel which could be used for outdoor applications such as a roadside absorptive barrier.

Any discussion of documents, devices, acts or knowledge in this specification is included to explain the context of the invention. It should not be taken as an admission that any of the material formed part of the prior art base or the common general knowledge in the relevant art in Australia or any other country on or before the priority date of the claims herein.

SUMMARY OF THE INVENTION

In accordance with the present invention in its broadest form, there is provided a panel including a substantially air impermeable membrane layer and a layer having apertures therein. Each portion of the membrane layer which overlies an aperture defines a diaphragm which is able to vibrate in response to sound waves incident on the membrane layer and thereby absorb at least part of the sound waves' energy. At least some of the apertures are arranged in clusters whereby the greatest distance between adjacent apertures within a cluster is less than the distance between i) any one of the apertures within the cluster and ii) any aperture outside of the cluster.

In accordance with a more specific form of the present invention, there is provided a panel including a substantially air impermeable membrane layer and a layer having apertures therein, wherein each portion of the membrane layer which overlies an aperture defines a diaphragm which is able to vibrate in response to sound waves incident on the membrane layer and thereby absorb at least part of the sound waves' energy, at least some of the apertures being arranged in clusters whereby the greatest distance between adjacent apertures within a cluster is less than the distance between i) any one of the apertures within the cluster and ii) any aperture outside of the cluster, each region of the panel defined by an outer periphery of a cluster forming a resonance absorber which is able to vibrate in response to sound waves and thereby absorb at least part of the sound waves' energy, wherein at least one resonance absorber is able to provide sound absorption at a frequency which is different to the frequency of resonance of at least one of the individual diaphragms.

Preferably, at least one resonance absorber is able to provide sound absorption at a frequency which is lower than the frequency of resonance of at least one of the individual diaphragms. In this respect, the frequency at which at least one resonance absorber is able to provide sound absorption may be the frequency of resonance of the at least one resonance absorber.

Preferably, the frequency of resonance of at least one of the resonance absorbers is lower than the resonant frequency of one or more of the individual diaphragms. Further, the frequency of resonance of the resonance absorbers is preferably different to a resonant frequency of the panel as a whole. In a preferred embodiment, the frequency of resonance of at least one of the resonance absorbers is between the frequency of resonance of any of the diaphragms and the resonant frequency of the panel as a whole.

The regions of the panel which define the resonance absorbers may have a lower mass per unit area compared to the remaining region of the panel. Further, the apertures within a cluster may provide the portion of the sound absorbing layer within the resonance absorber with an open area of approximately 60% or greater.

In a particularly preferred embodiment, the clusters are substantially evenly distributed in the apertured layer. In this regard, the clusters may be substantially arranged in columns and rows such that the remaining portion of the apertured layer has a grid-like appearance.

Preferably, at least some of the apertures within a cluster are of different size. In addition, the apertures within one or more of the clusters may be substantially circular and range between approximately 8 mm and 80 mm in diameter. The size and number of apertures within a cluster may be predetermined based upon the resonant frequency required for the corresponding resonance absorber. At least two of the apertures within a cluster may be of the same size. Further, a plurality of clusters may include between approximately two and seven apertures. Adjacent apertures within a cluster can be spaced apart by approximately 2 mm to 6 mm.

In one embodiment, all of the apertures can be arranged in clusters. In an alternative embodiment, the distance between adjacent apertures outside of a cluster is equal or greater than (i) the distance between any aperture within a cluster and (ii) the nearest aperture outside of the cluster. The apertures outside of the clusters may provide the remaining portion of the apertured layer with an open area of approximately 40% or less. A multiple number of the apertures outside of the clusters can be smaller than the apertures within one or more of the clusters. Further, a multiple number of the apertures outside of the clusters can be substantially circular and range between approximately 10 mm and 20 mm in diameter. Adjacent apertures outside of the clusters may be spaced apart by approximately 8 mm to 20 mm. In a particularly preferred embodiment, a multiple number of apertures outside of the clusters are of substantially the same size. Although the apertures are preferably circular, apertures of other shapes are possible.

The composition of the apertured layer and the membrane layer is to some degree dependent upon the intended application of the panel. For some applications of the panel, the apertured layer is made of a bonded fibrous material and having a thickness of approximately 4 to 15 mm, with a preferred thickness of approximately 10 mm. For other applications of the panel, the apertured layer may be formed of a suitable foam, for example a substantially incompressible, closed cell foam, a phenolic foam, a fibre reinforced foam or cardboard composite.

The membrane layer may be made of paper, for example, kraft paper or clay coated paper with a surface density of approximately 45 to 70 $g/m^2$. When painted with two coats of paint, the membrane layer preferably has a surface density of less than 200 $g/m^2$, more preferably between approximately 150 and 170 $g/m^2$. However, for many applications the membrane layer is preferably made of a polymer film, a foil, a coated foil or a paper having a foil backing. The membrane layer is preferably bonded to the apertured layer with the portions of the membrane layer which overly the apertures defining the diaphragms.

In one application of the invention, the panel can be used as a wall panel of a wall structure, for example the interior wall structure of a building. The wall structure includes a frame upon which the panels may be fastened. Further, a plurality of the wall panels can be mounted to the frame to thereby provide a continuous wall surface whereby the membrane layer of each panel lies flush with the wall surface. The arrangement of apertures in clusters provides the panel with a series of resonance absorbers which are able to vibrate at maximum amplitude when imparted with sound waves of a frequency corresponding to their resonant frequency, thereby reducing sound wave energy.

As the resonance absorbers have a resonant frequency which is different to the resonant frequency of the diaphragms within the resonance absorbers, the panel is able to absorb sound wave energy across a broader range of frequencies. The resonant frequency of a resonance absorber is dependent upon the number and size of the diaphragms within the resonance absorber and the spacing between the apertures in the cluster. The resonance absorbers advantageously avoid the need for the panel to have relatively large diaphragms as each resonance absorber is able to provide comparable resonance absorption to such diaphragms. Accordingly, the panel can be provided with relatively smaller apertures and associated diaphragms in the membrane layer. This is particularly advantageous when the panel is used as an interior wall panel of a building as it enables the surface finish of the membrane layer to be maintained such that the membrane layer can mimic the flat surface appearance of the outer surface of a conventional plasterboard panel. Further the increased percentage, overall, of the smaller diaphragms increases the efficiency of absorption at the corresponding frequencies.

BRIEF DESCRIPTION OF THE DRAWINGS

Further benefits and advantages of the present invention will become apparent from the following description of preferred embodiments of the invention. The description should not be considered as limiting any of the statements in the previous section. The preferred embodiments will be described with reference to the following figures in which.

DESCRIPTION OF PREFERRED EMBODIMENTS

Figure 1:
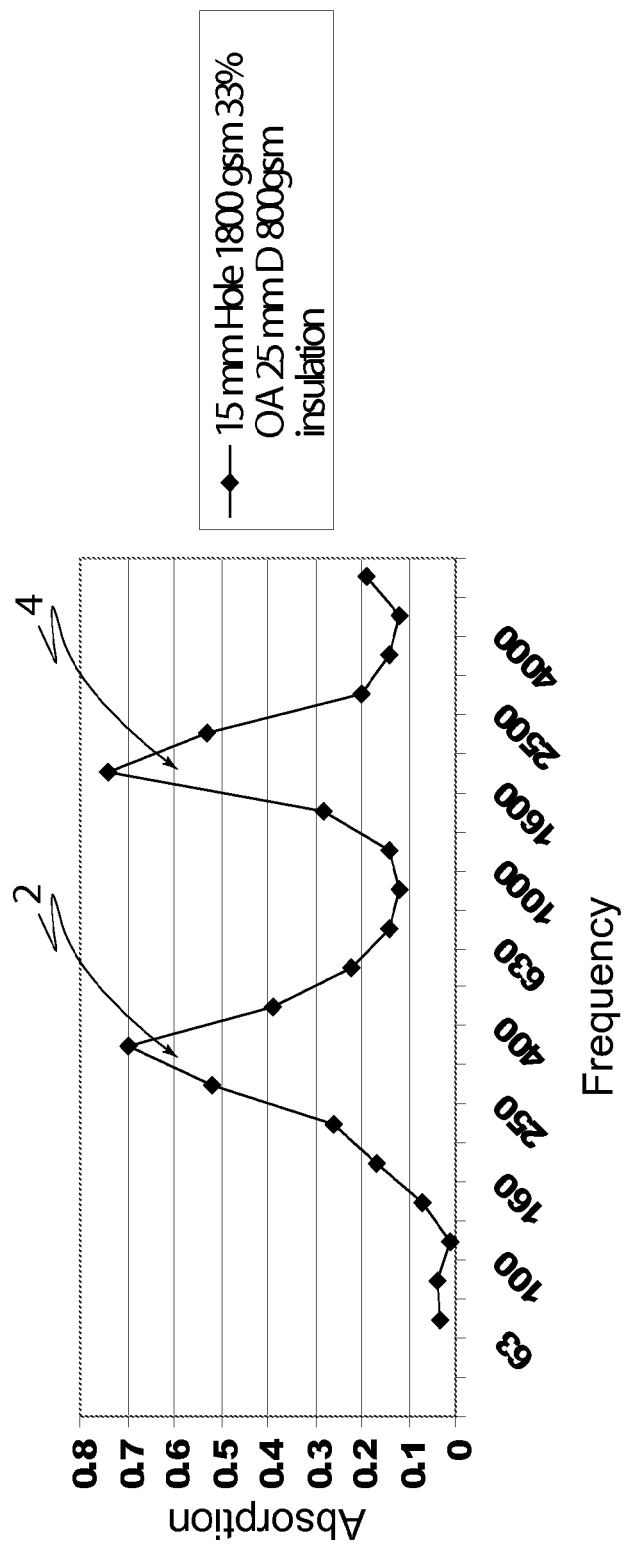
FIG. 1 is a graph showing the absorption coefficient of a sample prior art Bellmax panel at a range of frequencies.
Figure 2:
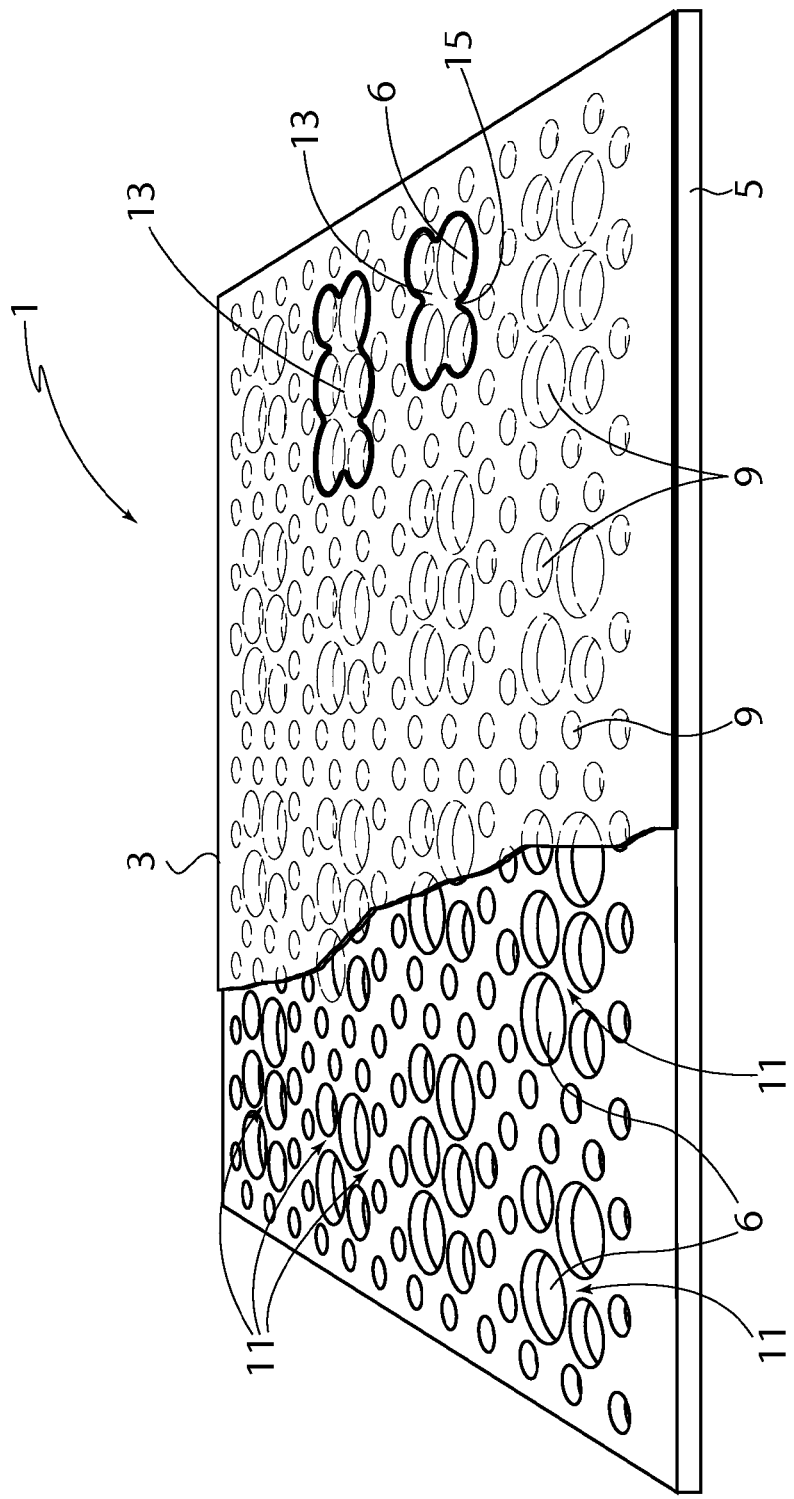
FIG. 2 is a perspective view of a section of a panel, in accordance with an embodiment of the invention, showing the membrane layer partially covering the apertured layer.

With reference to FIG. 2 of the accompanying drawings there is shown a panel 1 in accordance with an embodiment of the invention. The panel 1 includes a substantially air impermeable membrane layer 3 and a layer 5 having apertures 6 therein. The apertures 6 in the layer 5 preferably define a plurality of passageways which extend through the layer 5, hereinafter referred to in this section as the apertured layer 5. A section of the membrane layer 3 has been removed from the panel 1 in FIG. 2 such that the apertures 6 can be more clearly seen. Each portion of the membrane layer 3 which overlies a passageway defines a diaphragm 9 which is able to vibrate in response to sound waves incident on the membrane layer 3 and thereby absorb at least part of the sound waves energy. In this respect, each diaphragm 9 has a resonant frequency at which the diaphragm 9 will vibrate at maximum amplitude when imparted with sound waves of a frequency which corresponds to the diaphragm's resonant frequency, thereby reducing sound wave energy. Generally speaking, increasing the size of a diaphragm 9 will lower the diaphragm's resonant frequency.

In addition to each individual diaphragm 9 being a resonating element, additional resonating elements are provided in the panel 1 by arranging at least some of the apertures 6 into clusters 11 whereby the apertures 6 within a cluster 11 are more closely spaced together compared with those apertures 6 outside of the cluster 11. More specifically, at least some of the apertures 6 are arranged in clusters 11 whereby the greatest distance between adjacent apertures 6 within a cluster 11 is less than the distance between, on the one hand, any one of the apertures 6 within the cluster 11 and, on the other hand, any aperture outside of the cluster 11. Each region of the panel 1 defined by an outer periphery of a cluster 11 forms a resonance absorber 13 which is able to vibrate in response to sound waves and thereby absorb at least part of the sound waves energy. Like the diaphragms 9, each resonance absorber 13 has a resonant frequency at which the resonance absorber 13 will vibrate at maximum amplitude when imparted with sound waves of a frequency which corresponds to the resonance absorber's resonant frequency, thereby reducing sound wave energy. As shown in FIG. 2, each resonance absorber 13 includes a portion of the membrane layer 3 and a portion of the underlying apertured layer 5 which is defined by the outer periphery of a cluster 11.

Figure 3:
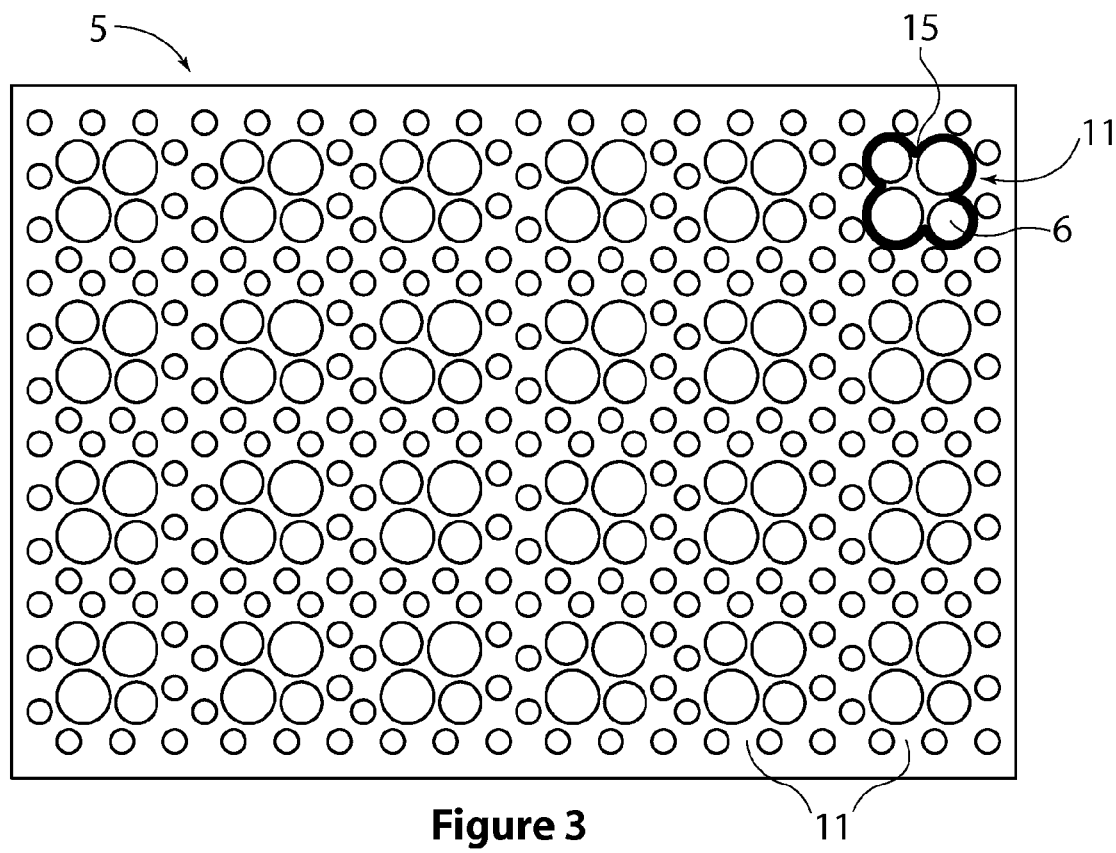
FIG. 3 is an illustration of one side of an apertured layer, with at least some of the apertures being arranged in clusters, the apertures within clusters being 30 mm and 20 mm in diameter and apertures outside of the clusters being 13 mm in diameter, in accordance with an embodiment of the invention.
Figure 4:
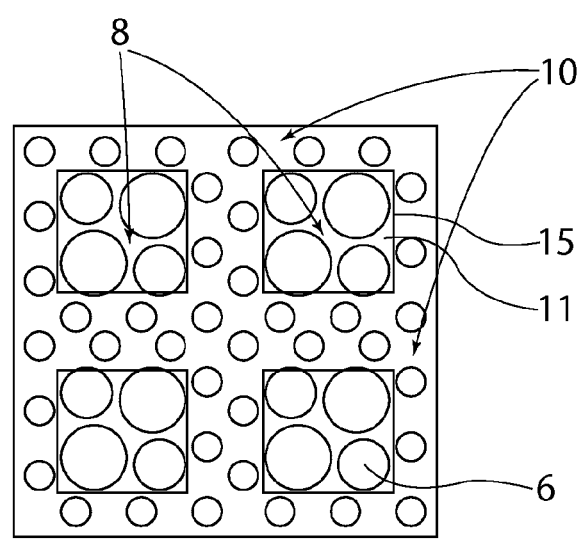
FIG. 4 is a close up view of a portion of the apertured layer shown in FIG. 3 with the boundary of four resonance absorbers being shown around the outer periphery of the clusters.
Figure 11:
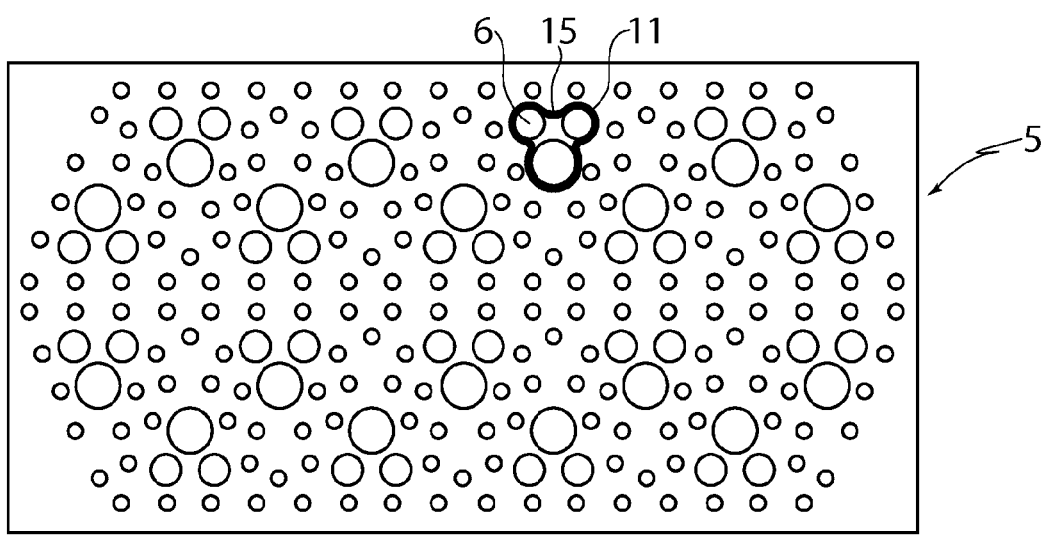

With reference to FIGS. 2-4, 7, 10 and 11, the outer periphery of a cluster 11, which defines the region of the panel 1 that forms a resonance absorber, consists of an edge portion of each aperture 6 within the cluster 11 together with an imaginary line 15 which adjoins neighbouring apertures 6 within the cluster 11. For the sake of clarity, FIGS. 3, 4, 5, 7 to 13 illustrate the apertured layer 5 without the membrane layer 3 thereon. In FIG. 4, the imaginary line 15 interconnecting adjacent apertures 6 within the clusters 11 comprises four tangent lines. Each tangent line intersects with an edge portion of two neighbouring apertures 6 within the cluster 11. The area bound by the four tangent lines being the area of a resonance absorber. In contrast, the imaginary line 15 between adjoining apertures 6 in the clusters 11 shown in FIG. 11 is positioned at the shortest distance between adjoining apertures 6 within the clusters 11. Accordingly, the imaginary line 15 between adjoining apertures 6 can be a tangent or a line at the shortest distance between adjoining apertures 6 of the cluster 11, or a line at any position therebetween.

Irrespective of the exact position of the imaginary line 15, the regions of the panel 1 which define the resonance absorbers have a lower stiffness and a lower mass per unit area compared to the remaining region of the panel 1. In this regard, with reference to FIG. 4, it can be seen that the apertures 6 within the clusters 11 are closely spaced and thereby provide the portion 8 of the apertured layer 5 within each resonance absorber with an open area of approximately 60% to 80%. Accordingly, the region of the panel 1 defined by a resonance absorber has a low mass per unit area compared to the remaining region of the panel 1 as the apertures 6 outside of the clusters 11 are more spaced apart and thereby provide the remaining portion 10 of the apertured layer 5 with an open area of approximately 15% to 35%. The positioning of the apertures 6 within clusters 11 thereby provides the panel 1 with areas where the mass per unit area is low relative to the remaining portion of the panel 1. In other words, the stiffness of the panel 1 varies with the resonance absorbers being regions that are less stiff in comparison to the remaining portion of the panel 1. It is the relatively lower stiffness or lower mass per unit area of the resonance absorbers, which enable the resonance absorbers to have a different resonant frequency to the panel 1 as a whole.

Figure 7:
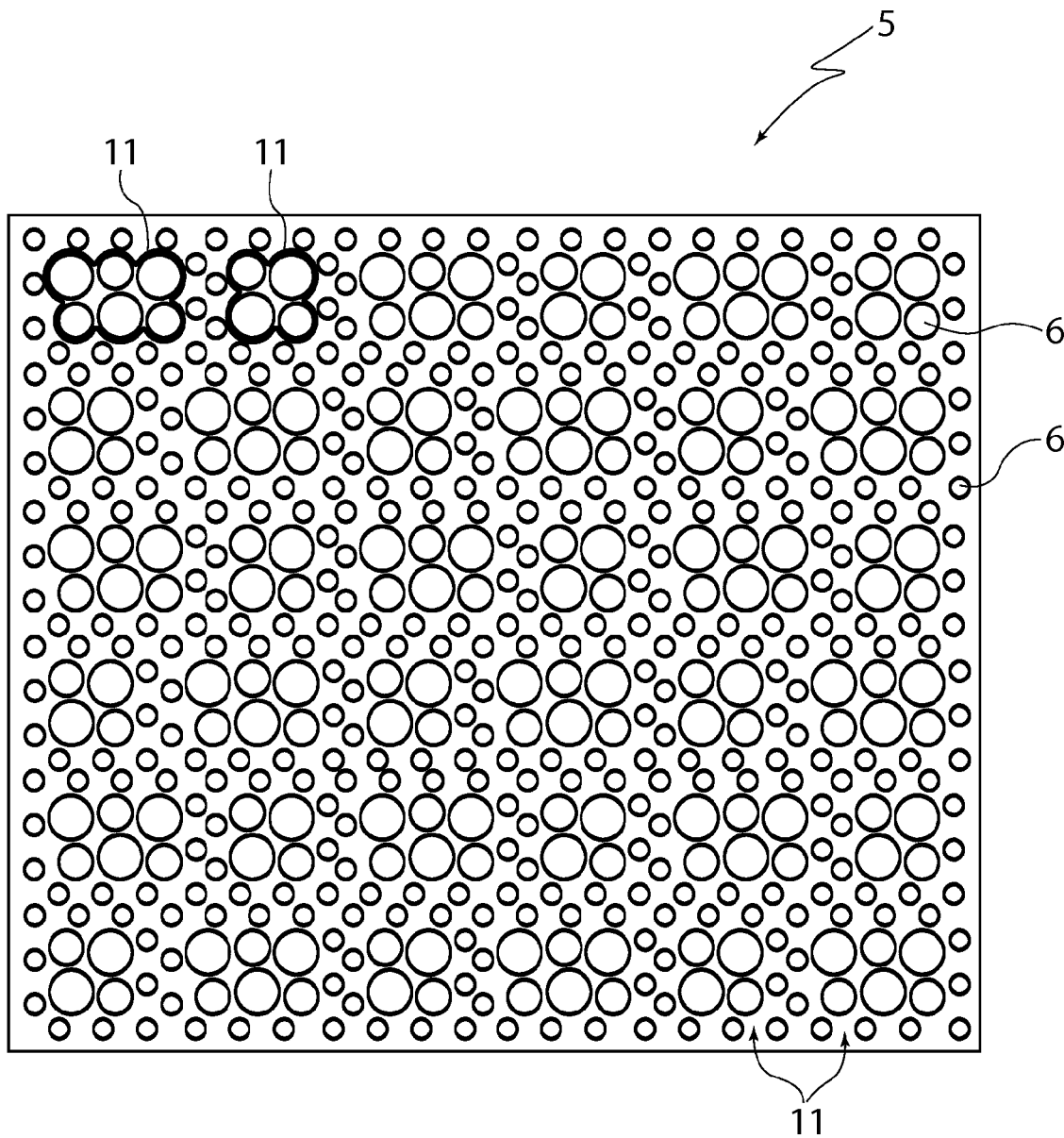
FIG. 7 is an illustration of one side of an apertured layer having some apertures in clusters of four and some apertures in clusters of six, in accordance with an embodiment of the invention.

The clusters 11 are preferably evenly distributed in the apertured layer 5 with the apertures 6 outside of the clusters 11 being relatively smaller and separated by a relatively greater distance to provide the remaining portion of the apertured layer 5 with a grid-like appearance. An approximately equal distance is provided between neighbouring apertures 6 within the clusters 11. As shown in FIGS. 3 and 7, the clusters 11 can be substantially arranged uniformly in columns and rows. As can be seen in FIGS. 3, 7, 9 to 13, the number of apertures 6 contained within each cluster 11 is variable with the minimum being three and the preferred number being between four and seven. Further, in the embodiment shown in FIG. 13, all of the apertures 6 can be provided in clusters 11.

In the embodiment of the apertured layer 5 shown in FIG. 7, some of the clusters 11 contain four apertures 6 whilst the remaining clusters 11 contain six apertures 6. Accordingly, those resonance absorbers having six apertures 6 have a different resonant frequency to those resonance absorbers having only four apertures 6.

Figure 8:
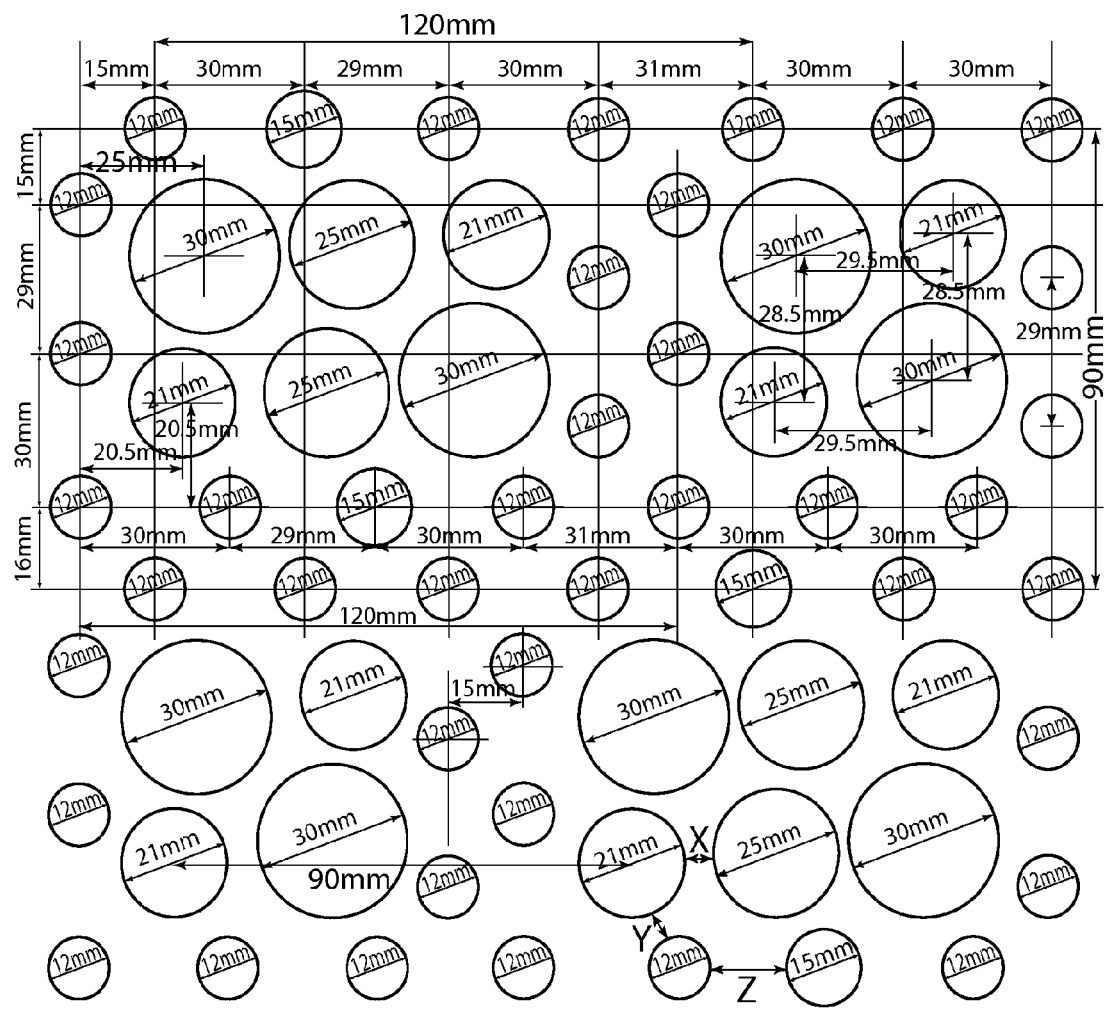
FIG. 8 is a partial view of the apertured layer illustrated in FIG. 7, showing the dimensions of the apertures and spacing between the apertures.

Although not to scale, FIG. 8 provides an indication of the approximate dimensions of the apertures 6 and the spacing between the apertures 6 in the apertured layer 5 shown in FIG. 7. The clusters 11 containing four apertures 6 measure approximately 54 mm by 55 mm and include two apertures having a diameter of 21 mm and two larger apertures 6 having a diameter of 30 mm. The clusters 11 containing six apertures 6 measure approximately 54 mm by 84 mm and have two apertures of 21 mm diameter, two apertures of 25 mm diameter and two apertures of 30 mm diameter. The apertures 6 in the remaining or grid portion of the apertured layer 5 are 12 mm and 15 mm in diameter. Adjacent apertures 6 within the clusters 11 are spaced apart between approximately 2 mm and 6 mm. The apertures 6 in the remaining or grid portion of the apertured layer 5 are approximately 8 to 20 mm apart. The apertures 6 within the clusters may have diameters ranging from 5 to 80 mm. The greatest distance between adjacent apertures within a cluster is less than the distance between i) any one of the apertures within the cluster and ii) any aperture outside of the cluster. In other words as shown in FIG. 8, distance X between adjacent apertures within a cluster is less than distance Y. Further, distance Z between adjacent apertures outside of the cluster is greater than or equal to distance Y.

Figure 12:
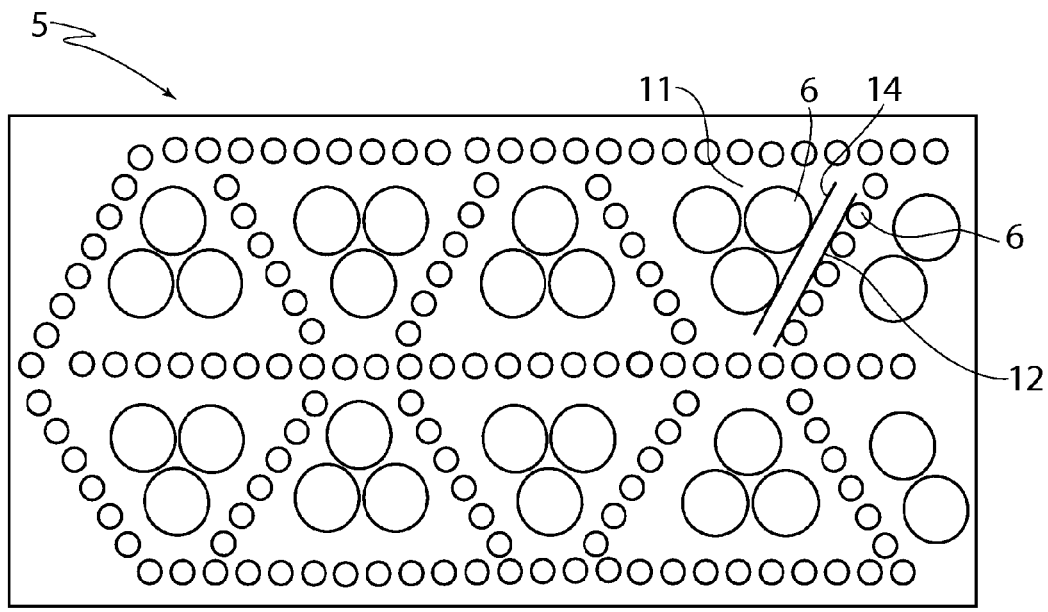
FIG. 12 is an illustration of one side of an apertured layer showing clusters containing three apertures and the spacing between the clusters and apertures outside of the clusters arranged in a grid pattern, in accordance with another embodiment of the invention.
Figure 13:
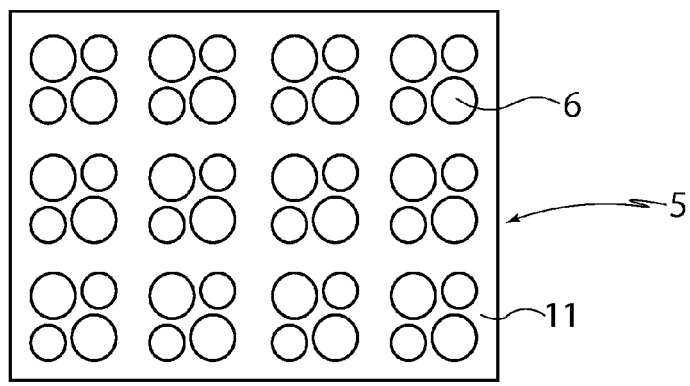
FIG. 13 is an illustration of one side of an apertured layer with all of the apertures being arranged in clusters, in accordance with another embodiment of the invention.

With reference to FIG. 12, apertures 6 outside of the clusters 11 may be arranged in a grid pattern and aligned with a tangent line 12. The apertures 6 outside of the clusters 11 being spaced by approximately 10 to 15 mm from a tangent line 14 drawn from the apertures 6 in the clusters 11. The apertures 6 outside of the clusters 11 could be used to target different frequencies to the clusters 11. In a further embodiment of the invention, all of the apertures 6 in the apertured layer 5 may be arranged in clusters 11, as illustrated in FIG. 13.

With reference to the dimensions shown in FIG. 8, there is effectively eight resonating elements provided when the apertured layer 5 shown in FIG. 7 is covered with a membrane layer 3 to provide a panel 1. The first resonating element being the 12 mm diaphragms, second being the 15 mm diaphragms, the third being the 21 mm diaphragms, the fourth being the 25 mm diaphragms, the fifth being the 30 mm diaphragms, the six being the resonance absorbers containing four apertures 6, the seventh being the resonance absorbers containing six apertures 6 and the eighth being the panel 1 as a whole acting as a panel absorber. The 12 mm diaphragms have a resonant frequency of approximately 2000 Hz, the 15 mm diaphragms have a resonant frequency of approximately 1600 Hz, the 21 mm diaphragms have a resonant frequency of approximately 1250 Hz, the 25 mm diaphragms have a resonant frequency of approximately 1000 Hz and the 30 mm diaphragms have a resonant frequency of approximately 800 Hz. The resonance absorbers containing the four apertures have a resonant frequency of approximately 500-630 Hz, and the resonant absorbers containing the six apertures have a resonant frequency of approximately 400-500 Hz.

In addition to resonance absorption by the individual diaphragms 9 and the resonance absorbers, the panel 1 as a whole functions as a panel absorber in combination with an enclosed air volume behind the panel 1. In this regard, the panel 1 as a whole is able to resonate in response to sound waves incident on the panel 1 with dampening being provided by the enclosed air volume. When the panels 1 are installed in a wall structure having a frame consisting of a plurality of wall studs, the cavity between adjoining wall studs provides the enclosed air volume. The panels 1 can be fastened to the wall studs in the same manner as conventional plasterboard panels by using nails, screws, adhesives or the like. Sound absorbing material can also be located in the cavities and the depth of the cavities behind the panels 1 can be altered to vary the frequency at which peak absorption is provided by the panel absorber. For other applications of the panel, for example as a roadside absorptive barrier, the panels 1 are mounted in a similar form of frame structure to thereby provide an enclosed air volume behind the panels 1.

The membrane layer 3 is substantially impermeable to air flow. The membrane layer 3 may be made of paper, for example a type of paper commonly known as clay coated paper. Other types of paper can also be used, for example wall paper, high wet strength kraft paper. It is however preferred that the membrane layer 3 be made of a polymer film, for example polyester, polyethylene, polypropylene, BOPP, fluoropolymer, PVC, EVA, or a metallic foil. The membrane layer 3 may also be multilayered and consist of a combination of the above materials. Unpainted, the membrane layer 3 preferably has a thickness which is no greater than approximately 0.05 mm and a surface density of approximately 45 to 70 $g/m^2$. For applications of the panel as an interior wall lining, clay coated paper can be used for the membrane layer 3. The clay component of the paper provides a seal which prevents seepage of paint into the paper when paint is applied. In addition, the clay component removes the need for the paper to be first painted with an undercoat paint. When painted with two top coats of paint, the membrane layer 3 preferably has a surface density of less than 200 $g/m^2$, more preferably between approximately 150 and 170 $g/m^2$. Accordingly, when the membrane layer 3 is painted, the dried paint provides approximately 60-70% of the diaphragms 9 surface density. During application of paint, the paint tends to shrink and flatten as the paint dries which provides tension to the diaphragms 9.

The painting of the membrane layer 3 also has an impact on the sound absorption capabilities of the diaphragms 9. In this respect, each coat of paint slightly reduces peak sound absorption at the diaphragms 9 resonant frequency. In addition, the increase in the surface density of the diaphragms 9 which each coat of paint provides tends to slightly lower the diaphragms 9 resonant frequency. Further, each coat of the paint narrows the sound absorption peak of the diaphragms 9. For these reasons, it is preferable that no more than two coats of paint are applied to the membrane layer 3.

The membrane layer 3 can be bonded to the apertured layer 5 with adhesive. For example, a thin layer of polyethylene, low density polyethylene (LPDE), EVA or combination thereof may be provided on the apertured layer 5 and/or the membrane layer 3 with heat being applied to laminate the membrane layer 3 to the apertured layer 5. A metal foil, for example an aluminium foil may also be applied to the apertured layer 5 prior to the application of the membrane layer 3. In this respect, the foil may be laminated to the apertured layer 5 using polyethylene fibres or a powder which is heated to laminate the foil to the apertured layer 5. Similarly, the foil can be bonded to the membrane layer 3 in this manner, or alternatively a polyethylene bonding layer may be used. The foil is preferably applied prior to the apertures 6 being formed in the apertured layer 5 such that the apertures 6 can be formed in the foil and apertured layer 5 simultaneously in a single punching action. The foil preferably has a thickness of approximately 50 um.

The apertured layer 5 provides the bulk of the panel 1 and may be made of materials having sound absorbing properties. For example, the apertured layer 5 may be made of compressible fibrous materials such as bonded non-woven polyester, polyester blend, rockwool, fibreglass, or other fibrous polymers. Other materials such as open or closed cell foams, phenolic foam, fibre reinforced foams, cardboard could also be used depending upon the application of the panel 1. For applications of the panel 1 as the lining of an interior wall of a building the apertured layer 5 has a thickness of approximately 9 mm to 10.5 mm, preferably 10 mm, to match 10 mm thick plasterboard, and a surface density between approximately 1000 and 2000 $g/m^2$ (without apertures). Other thicknesses would match other plasterboard thicknesses, such as 7 mm, 13 mm and 16 mm. Preferably, the apertured layer 5 has a surface density of approximately 1700 $g/m^2$ (without apertures). The apertured layer 5 may further include approximately 5 to 20% flame retardant fibre, 40% melt fibre and 45 to 55% recycled PET. The apertured layer 5 provides the panel 1 with structural rigidity and depending upon the materials used for the layer 5, may be constructed such that the opposing sides of the apertured layer 5 are considerably more dense than the middle region between the sides. In this respect, when the layer 5 is made of non-woven polyester, the non-woven polyester fibres at the sides of the layer 5 can be highly lapped, needled and heated to compress the fibres and provide the sides with a relatively smooth and flat surface finish. In contrast, the non-woven polyester fibres in the middle region are compressed to a lesser degree. The relatively lower density in the middle region of the apertured layer 5 can assist to broaden the sound absorption peaks, particularly at the lower frequencies where the sound absorption is primarily due to the panel 1 as a whole functioning as a panel absorber. Other suitable materials with overall densities less than 200 $kg/m^3$, such as foam or cardboard composites may also be appropriate.

Figure 9:
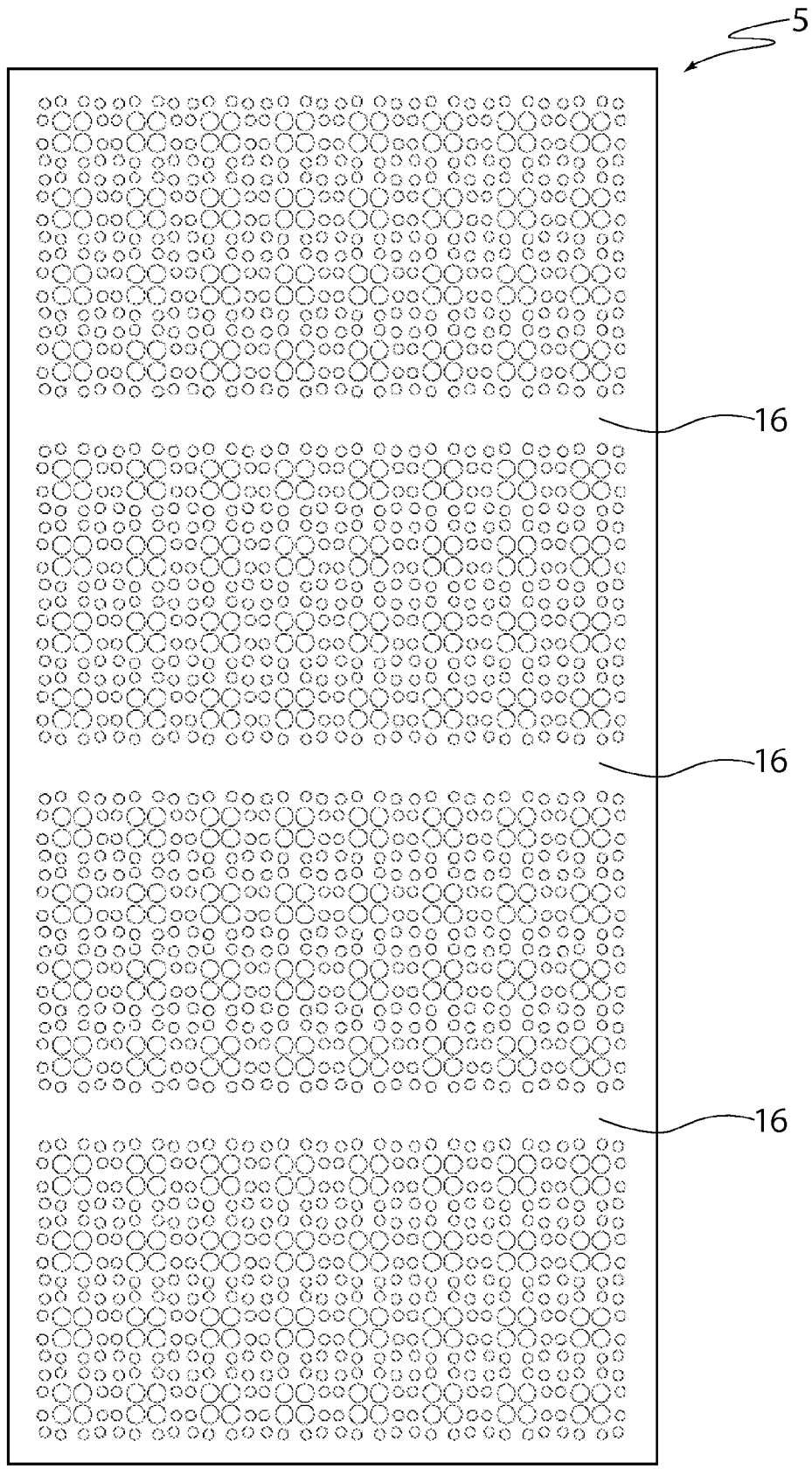
FIG. 9 is an illustration of one side of an apertured layer, which is particularly suitable for a panel to be used as an interior wall lining, in accordance with an embodiment of the invention.
Figure 10:
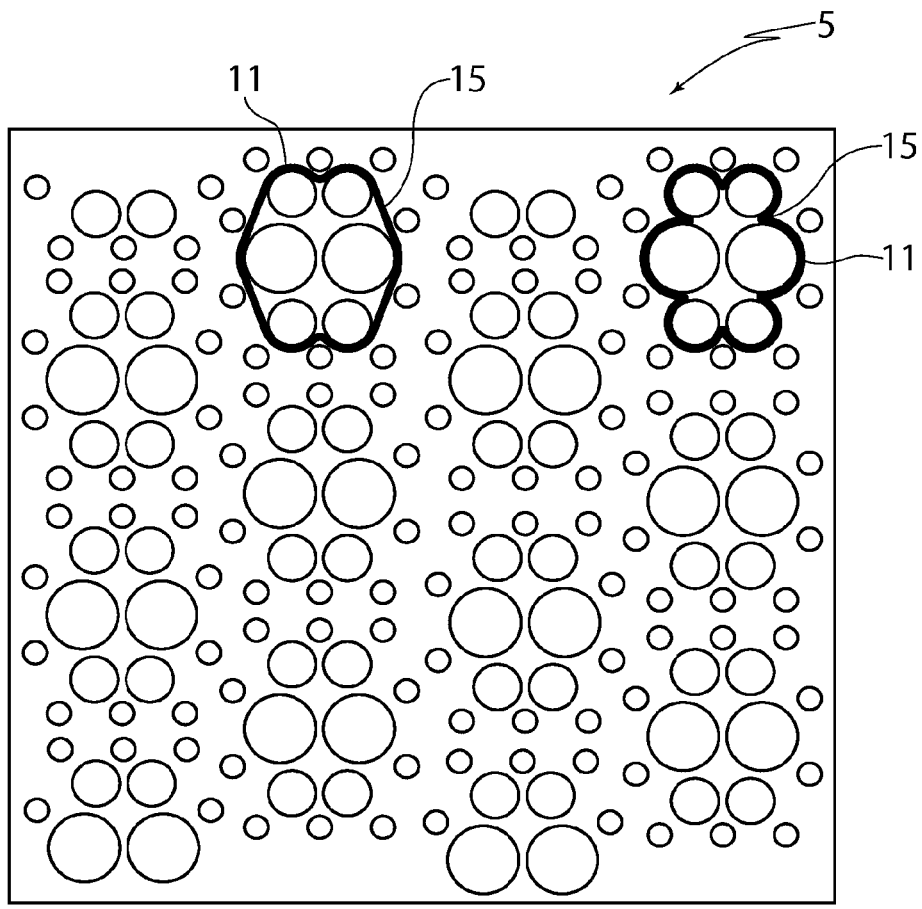
FIGS. 10 and 11 are illustrations of one side of an apertured layer showing the apertures arranged in clusters of six apertures and three apertures, respectively, in accordance with further embodiments of the invention.

For applications of the panel 1 as the lining of an interior wall of a building, the panel 1 preferably has a length of approximately 2400 mm, a width of approximately 1200 mm, and a bevelled edge to match the edge portion of a conventional plasterboard panel. This could be changed to suit customer preference and manufacturing efficiency. The overall thickness of the panel 1 is preferably the same as conventional plasterboard. However, the thickness of the panel 1 in the vicinity of the edge is reduced. As a result the thickness of the panel 1 tapers towards the edge portion with the edge resembling that of a conventional plasterboard panel. Accordingly, by using conventional wet plaster jointing techniques an infill of plaster can be provided over the edge portion such that the panel 1 can be seamlessly incorporated into a wall structure with the membrane layer 3 providing a continuous wall surface with the infill of plaster and an outer face of plasterboard panel. Once painted, the continuous wall surface has the same appearance of a wall structure made solely of plasterboard panels. In FIG. 9 there is shown an apertured layer 5, which is particularly suitable for a panel to be used as an interior wall lining. The apertured layer 5 is divided into four apertured sections. The apertured sections are spaced such that regions 16 between the apertured sections are able to be aligned with wall studs of a wall structure.

The following table provides an indication of the various resonance mechanisms that the panel in accordance with the present invention may utilise to target specific sound wave frequencies and provide absorption across a broad spectrum of frequencies.

| Frequency | Resonance Element |
| --- | --- |
| 160 Hz | panel absorber, cavity depth D = 95 mm |
| 200 Hz | panel absorber, cavity depth D = 50 mm |
| 250 Hz | panel absorber, cavity depth D = 35 mm |
| 315 Hz | panel absorber, cavity depth D = 25 mm |
| 400 Hz | clusters containing 6 apertures 21, 25 and 30 mm |
| 500 Hz | combination of 4 & 6 aperture clusters 21, 25 &30 mm |
| 630 Hz | clusters containing 4 apertures 21 and 30 mm |
| 800 Hz | 30 mm painted diaphragm |
| 1000 Hz | 25 mm painted diaphragm |
| 1250 Hz | 21 mm painted diaphragm |
| 1600 Hz | 15 mm painted diaphragm |
| 2000 Hz | 12 mm painted diaphragm |

The above table demonstrates that in order to provide peak absorption at approximately 315 Hz the panel 1 should ideally be mounted with an enclosed air volume behind the panel having a depth of approximately 25 mm. For absorption at a frequency of 250 Hz the panel should have a cavity of a depth of approximately 35 mm, at 200 Hz the depth should be approximately 50 mm and at 160 Hz the depth should be approximately 95 mm.

Figure 5:
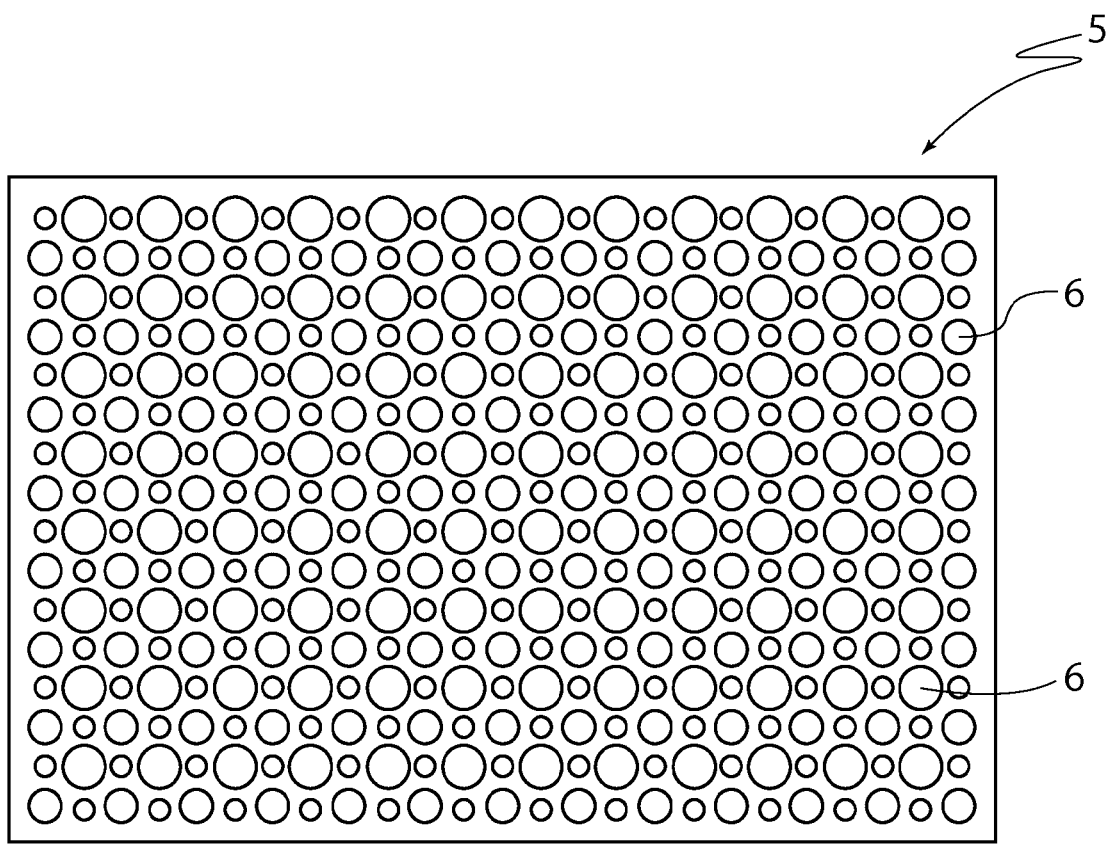
FIG. 5 is an illustration of one side of an apertured layer in accordance with the prior art, having the same sizes and number of apertures as the apertured layer of FIG. 3, with the apertures not arranged in clusters.
Figure 6:
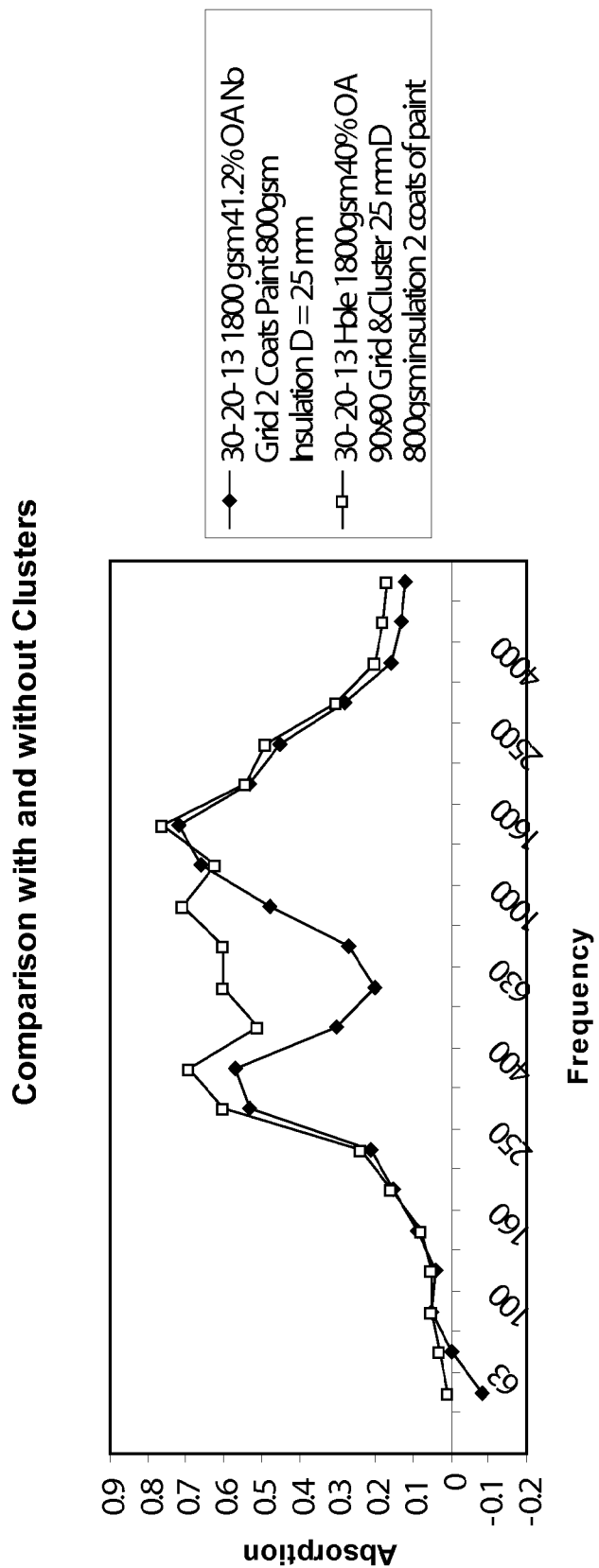
FIG. 6 is a graph showing a comparison of the absorption coefficient of two panels at a range of frequencies with one of the panels having an apertured layer as shown in FIG. 3, in accordance with an embodiment of the invention, and the other panel having an apertured layer as shown in FIG. 5.

FIG. 6 is a graph showing a comparison of the absorption coefficient of two panels at a range of frequencies with one of the panels having a clustered apertured layer 5 as shown in FIG. 3, in accordance with an embodiment of the invention, and the other panel having a layer with a configuration evenly spaced apertures in accordance with the prior art, as shown in FIG. 5. The layers 5 in FIGS. 3 and 5 tested were both made of a fibrous material. Further, both had the same number of 13 mm, 20 mm and 30 mm apertures and both provided approximately 40% open area. The layer in FIG. 3 has the 20 mm and 30 mm apertures arranged in clusters 11 whereas the apertures in FIG. 5 are evenly spaced. The panels tested were also mounted to provide a cavity with a depth of 25 mm behind the panels. In addition, the cavity had sound absorbing material located therein having a surface density of 800 g/m². The membrane layer of the two panels was also painted with two coats of paint. The graph in FIG. 6 shows that the panel having the clusters provided significantly better sound absorption at frequencies between 400 Hz and approximately 800 Hz than the panel having the apertures evenly spaced. The graph demonstrates that the panel in accordance with the present invention is able to provide excellent absorption over a broad range of frequencies by utilising a combination of resonating elements.

Figure 14A:
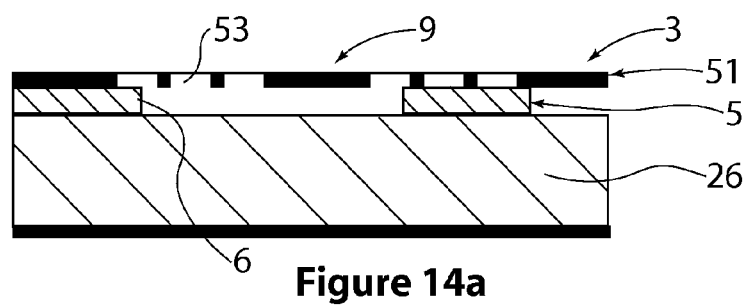
FIG. 14a is an illustration of a cross section of a portion of a wall type structure incorporating a panel having a reinforcement layer in accordance with an embodiment of the invention.
Figure 14B:
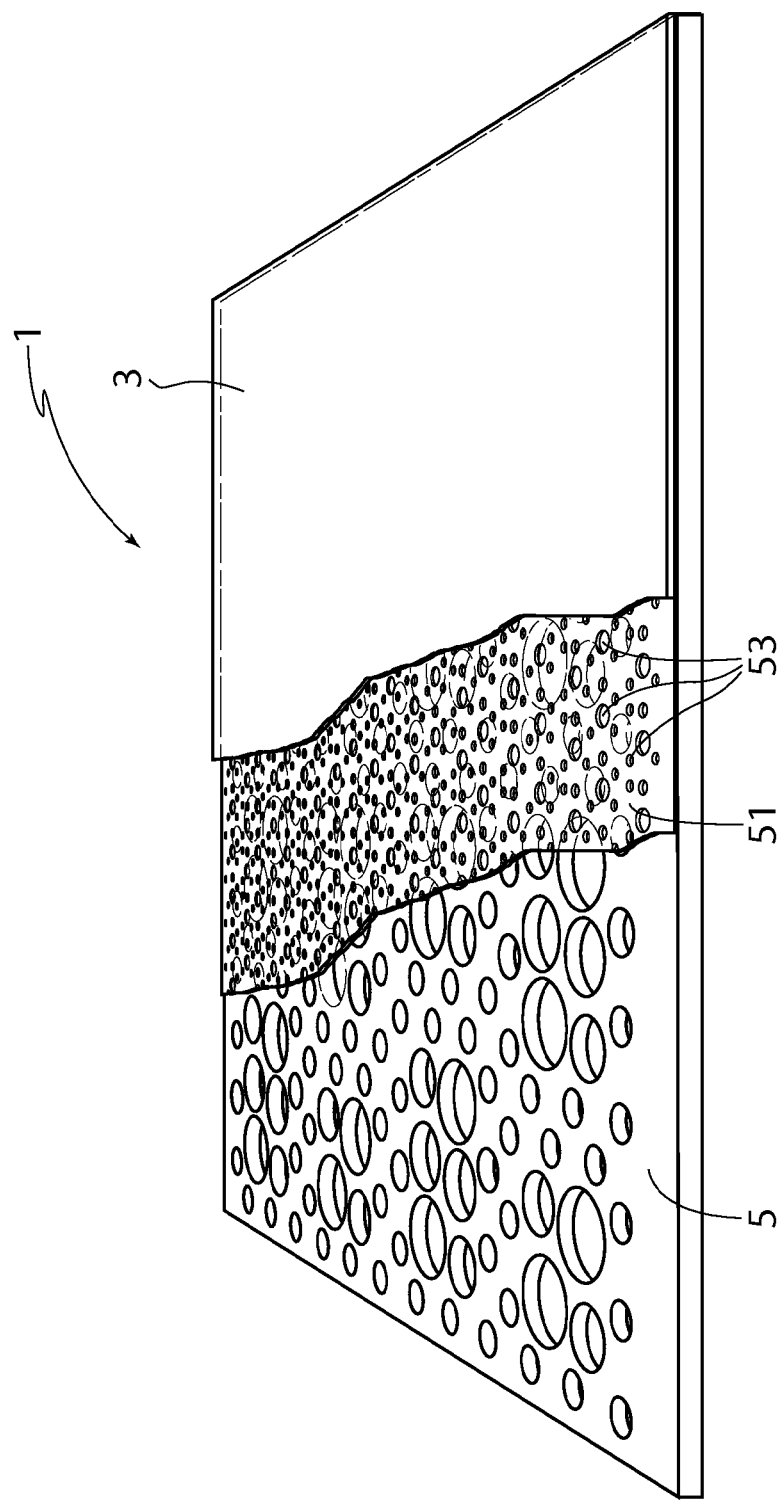
FIG. 14b is a perspective view of a section of a panel in accordance with an embodiment of the invention, showing the membrane layer partially removed from the panel and a reinforcement layer covering the apertured layer.

In FIGS. 14a and 14b of the accompanying drawings there is shown a panel 1 in accordance with a further embodiment of the invention. Like reference numerals are used throughout the Figures to refer to equivalent features. In this particular embodiment the panel 1 includes an additional layer in the form of a reinforcement layer 51 between the apertured layer 5 and the membrane layer 3. A section of the membrane layer 3 has been removed from the panel 1 in FIG. 14b such that the reinforcement layer 51 can also be more clearly seen. The reinforcement layer 51 may have a series of holes 53 therein which may be up to approximately 25 mm in diameter. As best seen in FIG. 14b, the holes 53 partially cover the apertures in the apertured layer 5. The holes 53 may also slightly overlap to provide multiple diameters. The holes 53 may be clustered together or arranged in a grid like formation, in a similar manner to the apertures in the apertured layer 5. The reinforcement layer 51 advantageously enables the panel 1 to have a better surface finish. In this respect, membrane layers 3 made of polymer film have a tendency to slightly dip into larger apertures in the apertured layer 5 and the reinforcement layer 51 is able to provide additional support to the membrane layer 3 over the apertures. The holes 53 in the reinforcement layer 51 may provide the layer with an open area of up to 50%. Preferably, the combined weight of the reinforcement layer 51 and the overlying layer/s is no more than approximately 15% to 30% of the total weight of the panel 1. The reinforcement layer 51 is preferably thick enough to prevent the diaphragms in the membrane layer 3 from contacting the apertured layer 5. The reinforcement layer 51 preferably has a thickness of at least approximately 0.15 mm, a surface density of 100 g/m² to 500 g/m² (without apertures) and may be made of cardboard, a polymer sheet such as a polycarbonate sheet, a fibrous polymer sheet, a foam or foam rubber sheet, ceramic paper or a glass/mineral fibre sheet.

Figure 14C:
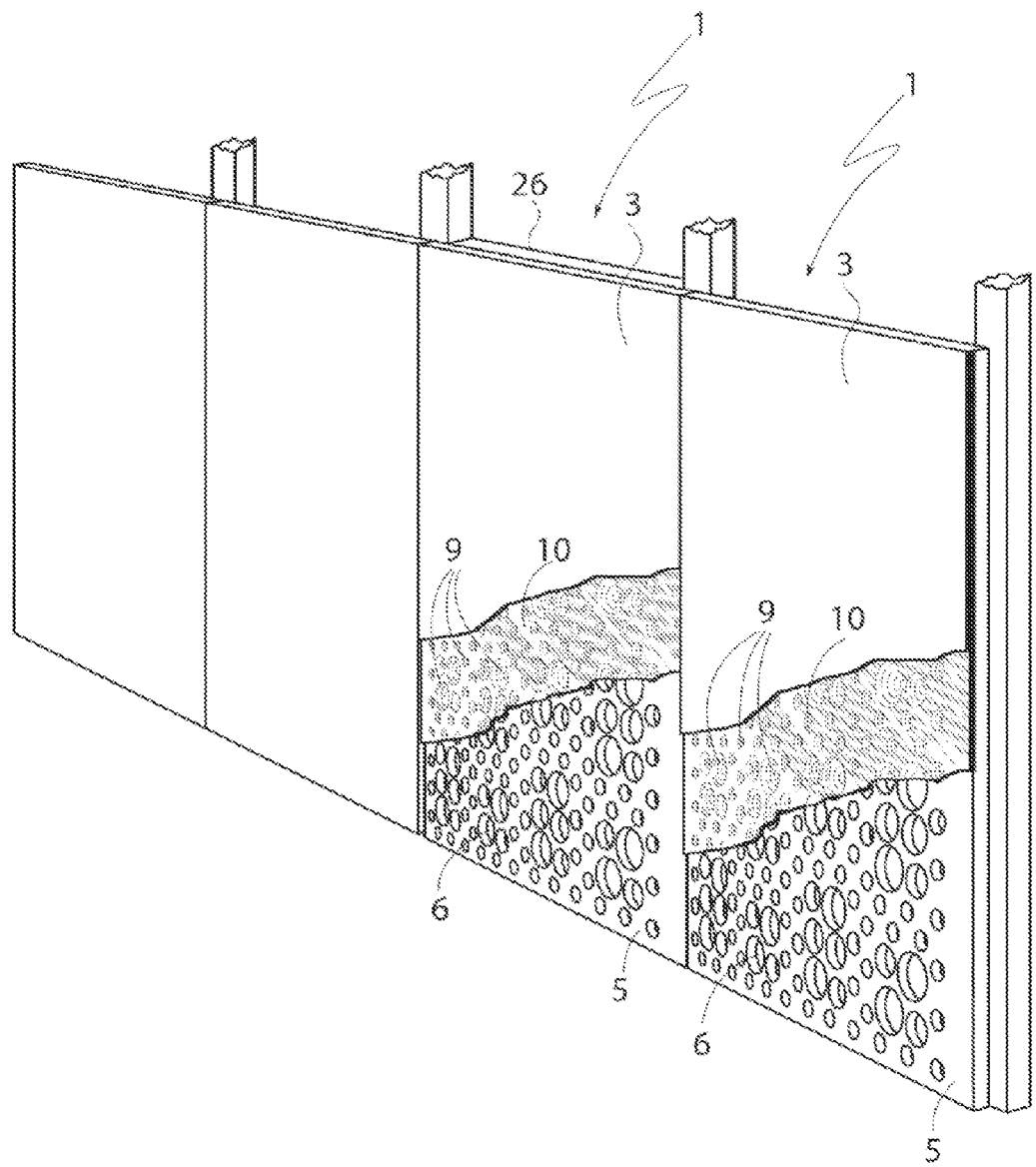
FIG. 14c is a perspective view of a wall type structure incorporating a series of panels in accordance with an embodiment of the invention, showing the membrane layer partially removed from the panels and a ceramic paper intermediate layer covering the apertured layer with a small section of the intermediate layer removed to expose a corner section of the apertured layer.
Figure 15:
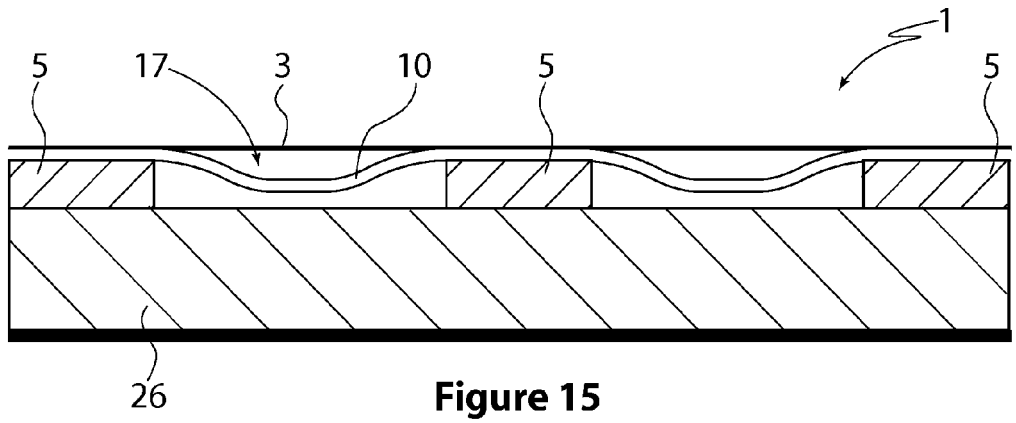
FIG. 15 is an illustration of a cross section of a wall type structure incorporating one of the panels shown in FIG. 14c with the intermediate layer being slightly depressed in the apertures in the apertured layer to provide an air gap, in accordance with an embodiment of the invention.

In FIGS. 14c and 15 of the accompanying drawings there is shown a panel 1 in accordance with a further embodiment of the invention. In this particular embodiment the panel 1 includes an additional layer in the form of an intermediate layer 10 positioned between the membrane layer 3 and the apertured layer 5. The panel 1 shown in FIG. 14c is particularly suited for lining an interior wall of a building and is shown in a wall type structure in FIGS. 14c and 15 with an enclosed air volume behind the panel 1 filled with insulation 26. In FIG. 14c a section of the intermediate layer 10 has been removed from each panel 1 such that the apertures 6 can be more clearly seen. A section of the membrane layer 3 has also been removed from the panels 1 in FIG. 14c such that the intermediate layer 10 can also be more clearly seen. In FIG. 14c, the intermediate layer 10 is bonded directly to the membrane layer 3 and is similarly directly bonded to the apertured layer 5. The membrane layer 3 is however not bonded to the intermediate layer 10 where the membrane layer 3 overlies the apertures 6 such that those portions of the membrane layer 3 which overlie the apertures 6 are free to vibrate independently of the intermediate layer 10 in response to sound waves incident on the membrane layer 3.

In the embodiment of the panel 1 illustrated in FIG. 14c, the membrane layer 3 is substantially impermeable to airflow and made of a polymer film. Alternatively, the membrane layer 3 can be made of a metal foil or paper, preferably clay coated paper. Other types of paper may also be used, for example wall paper, high wet strength kraft paper. The intermediate layer 10 of the panel 1 is positioned between the membrane layer 3 and the apertured layer 5 and covers a side face of the apertured layer 5 such that all apertures 6 are preferably covered by the intermediate layer 10. In the embodiment of the panel 1 shown in FIGS. 14c and 15, the intermediate layer 10 is made of a paper having ceramic fibres. The ceramic paper preferably has a thickness of approximately 1 mm and can advantageously act as a fire barrier due to its resistance to combustion and ability to withstand high temperatures. In this respect, ceramic paper has a melt point of 1300° C.

In the embodiments of the panel 1 which include an intermediate layer 10, rather than the membrane layer 3 being directly bonded to the intermediate layer 10 as shown in FIGS. 14c and 15, other additional layers may be provided. For example a metallic foil and/or a fibrous layer may be provided to which the membrane layer 3 may be directed bonded. Similarly, rather than the apertured layer 5 being directly bonded to the intermediate layer 10 as shown in FIGS. 14c and 15, additional layers may be provided to which the apertured layer 5 may be directly bonded. The intermediate layer 10 may therefore be sandwiched between additional layers, which may be porous or non-porous, rather than being directly bonded to the membrane layer 3 and the apertured layer 5. In order to bond the intermediate layer 10 to the apertured layer 5 a powdered low density polyethylene (LDPE) may be laid onto the apertured layer 5 with heat then applied to melt the LDPE powder and bond the apertured layer 5 to the intermediate layer 10. This is preferably achieved by using a belt laminator at a temperature above 150° C.

The intermediate layer 10 is preferably porous and made of a fibrous material or a foam material and preferably has surface density of less than 400 g/m². For example, the intermediate layer 10 could be made of a fibrous polymer sheet, an open cell foam or foam rubber sheet. Other materials such as fibrous ceramic paper, non woven glass/mineral fibre and polymers could also be used. The intermediate layer 10 provides a degree of protection to the underlying apertured layer 5 and is preferably resistant to combustion and can withstand extreme temperature without being substantially damaged. In addition the intermediate layer 10 improves the acoustic performance of the panel 1 by preventing reflected sound from behind the panel 1 being reflected back, for example into a room. Further, by providing an intermediate layer 10 of fibrous material, the edges of the apertures 6 are masked and softened by the intermediate layer 10 which results in a much smoother surface finish if the membrane layer 3 of the panel 1 is painted.

The membrane layer 3 can be bonded to the intermediate layer 10 using a suitable bonding agent. In this respect the membrane layer 3, for example the polymer film, may be dual layered in that it can have an underlaying layer, for example a LDPE layer, that can be melted using a belt laminator to bond the membrane layer 3 to the intermediate layer 10. As the membrane layer 3 is not bonded to the intermediate layer 10 where the membrane layer 3 overlies the apertures 6, small air pockets or gaps 17 are effectively provided between the intermediate layer 5 and the membrane layer 3, as can best be seen in FIG. 15. In order to increase the depth of the air gap 17 the intermediate layer 10 can be slightly pressed into the apertures 6 during manufacture or be preformed as such so that a series of hollows or depressions are provided preferably having a depth of approximately 1 to 4 mm. As the depressions lie slightly below the remaining portion of the intermediate layer 10, a bonding agent may be applied to the intermediate layer 10, for example by using a roller, without the depressions being imparted with bonding agent. Accordingly, the membrane layer 3 can then be bonded on top of the intermediate layer 10 without bonding to the depressions.

Figure 16:
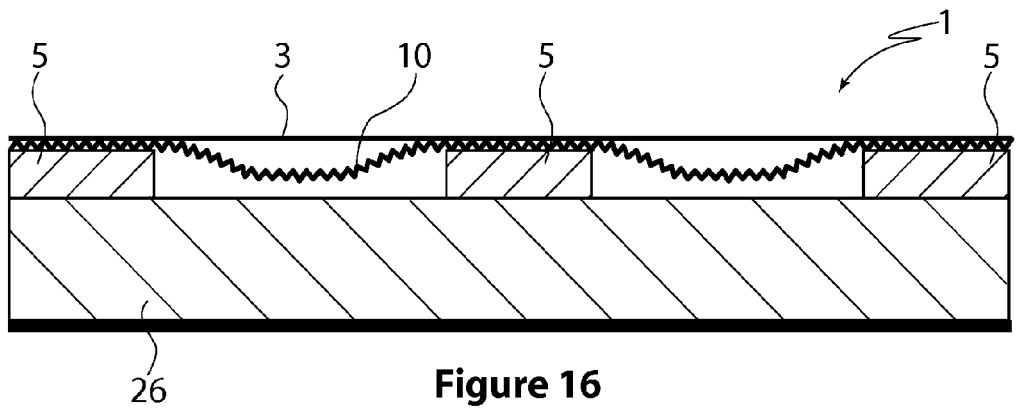
FIG. 16 is an illustration of a cross section of a portion of a wall type structure incorporating a panel having an embossed intermediate layer in accordance with an embodiment of the invention.
Figure 17:
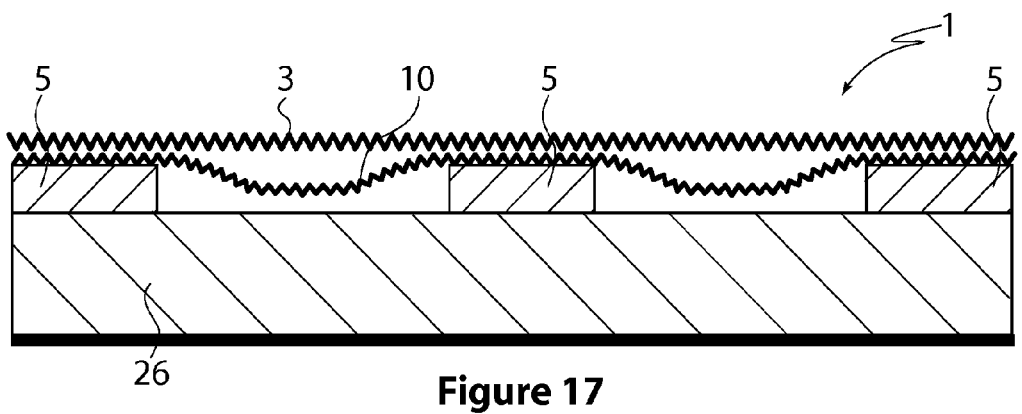
FIG. 17 is an illustration of a cross section of a portion of a wall type structure incorporating a panel having both an embossed intermediate layer and membrane layer in accordance with another embodiment of the invention.

In FIG. 16 of the accompanying drawings there is shown a further embodiment of the panel 1. In this particular embodiment, the panel 1 has an intermediate layer 10 which is embossed to provide the layer with a series of indentations. Similarly, the membrane layer 3 may also be embossed to provide a similar series of indentations, as shown in the embodiment illustrated in FIG. 17. Embossing the membrane layer 3 enables tension across the diaphragms to be reduced in comparison to a membrane layer 3 which is flat. In the embodiments shown in FIGS. 16 and 17 the membrane layer 3 is preferably formed from a metallic foil. The underlying intermediate layer 10 may also be formed from a non-porous material such as aluminium. As the intermediate layer 10 in this embodiment is non-porous, the intermediate layer 10 preferably has a surface density of less than approximately 400 g/m² and a thickness of no more then approximately 2.5 mm, preferably 1 mm. The apertured layer 5 in this embodiment may also be constructed of a sheet of metal such as aluminium having a surface density between approximately 1000 g/m² and 3000 g/m² (without apertures). Insulation 26 may also be provided in the cavity behind the panels 1.

The present invention advantageously provides a panel which can be used inside buildings as a substitute for conventional plasterboard panels. The panel according to the present invention is able to provide sound absorption over a broad range of frequencies and can be tailored to specific frequencies. At the same time, the panel can be painted and maintains an outer surface which is smooth, flat and has the same appearance as a conventional plasterboard panel. By incorporating the panels into interior walls lower reverberation times can be achieved, thereby reducing reverberated noise and subsequently improving the intelligibility of speech. The panel of the present invention is advantageously able to be used in a wall structure to create a wall having the same aesthetic appearance as a wall lined with conventional plasterboard panels. In addition, the panels according to the present invention are advantageously able to be integrated into a wall structure in an aesthetically pleasing manner. Further, the panels can be painted and can be installed utilising the same methods and skills as conventional plasterboard panels.

The panel is also suitable for automotive applications where the panel could be subject to heat from the engine or exhaust system, and other outdoor applications such as roadside absorptive acoustic barriers.

As the present invention may be embodied in several forms without departing from the essential characteristics of the invention it should be understood that the above described embodiments should not be considered to limit the present invention but rather should be construed broadly. Various modifications and equivalent arrangements are intended to be included within the spirit and scope of the invention.

The invention claimed is:

1. A panel including an air impermeable membrane layer and a layer having apertures therein,
    the membrane layer overlying the layer having apertures therein with the membrane layer forming a diaphragm at each location where the membrane layer traverses one of the apertures,
    each diaphragm being able to vibrate in response to sound waves incident on the membrane layer and thereby absorb at least some energy of the sound waves,
    the layer having apertures therein having a length and a width, at least some of the apertures being arranged in clusters which are spaced apart along the length and across the width of the layer having apertures therein, wherein each of said cluster is defined by a set of three or more apertures which are separated by a distance and a greatest distance between any two adjacent apertures within a particular one of said cluster is less than a distance between each aperture outside of said particular one of said clusters and each aperture within said particular one of said clusters,
    each aperture within each of said clusters having a length and a width, the apertures within each of said clusters being arranged to collectively provide each of said clusters with a length and width, the length and width of a particular one of said clusters being greater than the length and the width of each of the individual apertures within said particular one of said clusters,
    the panel having regions, each of said regions being defined by an outer periphery of one of said clusters and forming a resonance absorber which is able to vibrate in response to sound waves and thereby absorb at least some energy of the sound waves, wherein each resonance absorber is able to provide sound absorption at a frequency which is between a frequency of resonance of at least one of the diaphragms and a frequency of resonance of the panel as a whole.

2. A panel as claimed in claim 1 wherein the size and number of apertures within a particular one of said clusters is predetermined based upon the frequency at which sound absorption by a corresponding one of the resonance absorbers is required.

3. A panel as claimed in claim 1 wherein the apertures within a particular one of said clusters provides a portion of the aperture layer, within a corresponding one of the resonance absorbers, with an open area of approximately 60% or greater.

4. A panel as claimed in claim 1 wherein adjacent apertures within at least one of said clusters are separated by a distance of approximately 2 mm to 6 mm.

5. A panel as claimed in claim 1 wherein the clusters are substantially arranged in columns and rows such that the layer having apertures therein has a grid-like appearance.

6. A panel as claimed in claim 1 wherein the apertures within at least one of said clusters are substantially circular and range between approximately 8 mm and 80 mm in diameter.

7. A panel as claimed in claim 1 wherein at least some of the apertures within at least one of said clusters are of different size.

8. A panel as claimed in claim 1 wherein at least two of the apertures within at least one of said clusters are of the same size.

9. A panel as claimed in claim 1 wherein all of the apertures are arranged in clusters.

10. A panel as claimed in claim 1 wherein a multiple number of apertures outside of the clusters are smaller than the apertures within one or more of the clusters.

11. A panel as claimed in claim 10 wherein adjacent apertures outside of the clusters are spaced apart by approximately 8 mm to 20 mm.

12. A panel as claimed in claim 11 wherein a multiple number of the apertures outside of the clusters are substantially circular and range between approximately 10 mm and 20 mm in diameter.

13. A wall structure comprising:
a frame, and
a wall panel mounted to the frame, wherein the wall panel is the panel as claimed in claim 1.

14. A wall structure comprising:
a frame, and
a plurality of wall panels mounted to the frame to thereby provide a continuous wall surface, wherein each of said plurality of wall panels is the wall panel as claimed in claim 1.

15. A wall structure as claimed in claim 14 wherein the membrane layer of each said panel lies flush with the wall surface.

* * * * *